United States Patent [19]

Suzuki et al.

[11] Patent Number: 4,488,799
[45] Date of Patent: Dec. 18, 1984

[54] METERING SYSTEM USING A FOCUS DETECTING OPTICAL SYSTEM

[75] Inventors: Takashi Suzuki, Yokohama; Kazuya Hosoe, Kunitachi, both of Japan

[73] Assignee: Canon Kabushiki Kaisha, Tokyo, Japan

[21] Appl. No.: 528,240

[22] Filed: Sep. 1, 1983

Related U.S. Application Data

[63] Continuation-in-part of Ser. No. 367,733, Apr. 12, 1982, abandoned.

[30] Foreign Application Priority Data

Apr. 14, 1981 [JP] Japan .................................. 56-55763

[51] Int. Cl.³ ............................................. G03B 7/08
[52] U.S. Cl. .................................... 354/406; 354/412; 354/432
[58] Field of Search .............. 354/25 R, 25 A, 25 P, 354/25 N, 31, 31 F, 42, 49, 59, 152, 23 R, 201, 406, 407, 412, 432, 479; 352/140, 141; 250/201, 204, 201 PF

[56] References Cited

U.S. PATENT DOCUMENTS

| | | | |
|---|---|---|---|
| 3,286,097 | 11/1966 | Norwood | 354/31 X |
| 3,498,193 | 3/1970 | Shimomura et al. | 354/31 |
| 4,302,089 | 11/1981 | Fukuhara | 354/201 |
| 4,322,142 | 3/1982 | Kawamura et al. | 354/25 |
| 4,324,464 | 4/1982 | Wick | 354/25 |
| 4,349,254 | 9/1982 | Jyojiki et al. | 354/25 |

Primary Examiner—William B. Perkey
Attorney, Agent, or Firm—Fitzpatrick, Cella, Harper & Scinto

[57] ABSTRACT

There is provided a metering system using a focus detecting optical system characterized in that in a light path formed by an optical system for directing a light beam to focus detecting photoelectric transducer means, metering photoelectric transducer means, together with the focus detecting photoelectric transducer means, is disposed to effect the measurement of the brightness of an object as well.

22 Claims, 11 Drawing Figures

FIG. 1A

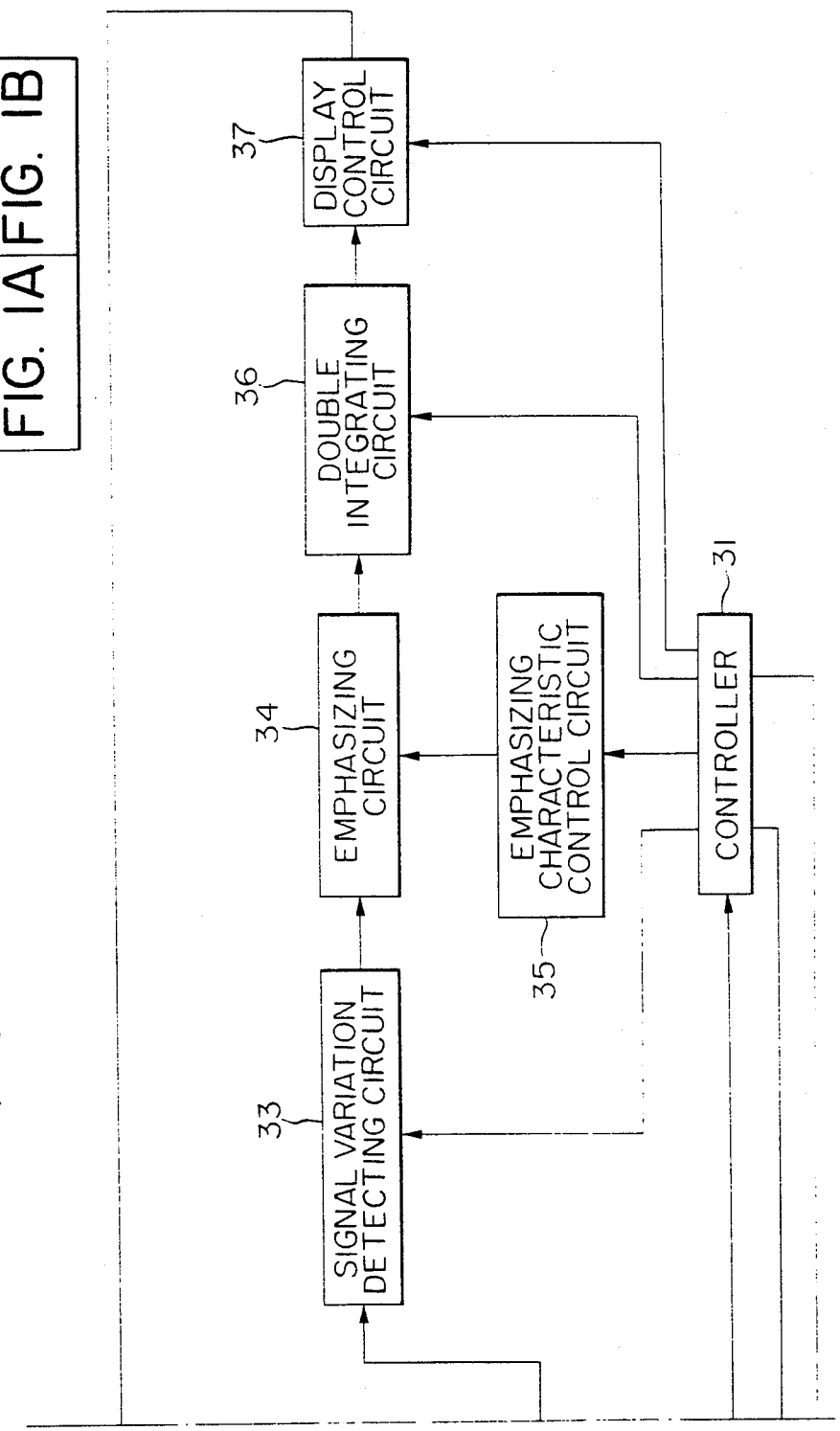

METERING SYSTEM USING A FOCUS DETECTING OPTICAL SYSTEM

This application is a continuation of application Ser. No. 367,733 filed Apr. 12, 1982, now abandoned.

BACKGROUND OF THE INVENTION

1. Field of the Invention

This invention relates to a metering system, and more particularly to a metering system suitable for an instrument such as a single lens reflex camera provided with a focus detecting system.

2. Description of the Prior Art

For example, there has been an idea of using a single photoelectric light-receiving means commonly for the metering and the focus detection, but generally, different characteristics are required of the light-receiving means for the metering and the focus detection. Therefore, if an attempt is made to achieve the compensation therefor on a circuit, there will occur a problem that the circuit necessarily becomes complex and the differrent characteristics cannot be sufficiently obtained. Also, particularly in a focus detecting system of the TTL image sharpness detection type, the light to be detected is the imaging light beam, but non-imaging light beam is preferable for the metering and accordingly, there occurs a fear that one of the focus detection and the metering cannot be achieved.

From such circumstances, where an attempt is made to equip a single lens reflex camera, particularly, a camera provided with a TTL type metering system, with a TTL type focus detecting system, there is adopted means of constructing these two systems in the camera entirely independent of each other, and in that case, due to the fact that the camera is a small and compact instrument, difficulties are encountered in arranging the metering light-receiving means and the focus detecting light-receiving means. Moreover, the fact that both of a metering optical system and a focus detecting optical system are required is liable to lead to inconveniences such as bulkiness of the camera and complication of the construction.

SUMMARY OF THE INVENTION

The present invention has been made in view of the above-noted circumstances and, as its primary object, provides a novel metering system which can eliminate all of the above-noted inconveniences peculiar to the prior art.

It is another object of the present invention to provide a metering system which is no trouble in arranging light-rceiving means and an optical system therefor and which is particularly suitable for an instrument such as a single lens reflex camera provided with a focus detecting system.

It is still another object of the present invention to provide an advantageous form of metering system whose rationality in both construction and function can be fully demonstrated, for example, in a single lens reflex camera or the like.

According to one aspect of the present invention, there is provided a metering system in which, in a light path formed by an optical system for directing a light beam to a focus detecting photoelectric transducer means, a metering photoelectric transducer means as well as the focus detecting photoelectric transducer means is disposed to effect the measurement of the brightness of an object as well.

According to one of the preferred embodiments of the present invention which will hereinafter be described, as a more rational method of the system which does not require much space, it is proposed to form the focus detecting photoelectric transducer means and the metering photoelectric transducer means on the same semiconductor substrate.

Further, in an embodiment of the present invention, a form of the optical system best suited for a form in which such a metering system and focus detecting system coexist, is also proposed. That is, where, for example, the imaging conditions of a plurality of images are compared in the focus detecting system, the colors, deflections and MTF characteristics of the optical systems dividing the light into images relative to the images must be coincident. In addition, using a part of those light beams for the metering requires these characteristics to be coincident more severly. In particular, if a dielectric material film is used in the beam splitter which divides the light beam, it will be very difficult for the color and deflection characteristics with respect to each divided light beam to be uniform. In an embodiment of the present invention, a mode of the optical system which will sufficiently satisfy such severe requirement is also proposed.

It is a further object of the present invention to provide a more advantageous form of the metering system which has a plurality of metering modes and which is capable of using these modes properly thereby being very functional.

Under such object, in the preferred embodiment of the present invention, there is also proposed, for example, a system in which, in addition to said metering photoelectric transducer means, a metering photoelectric transducer means having a different metering field is disposed and the outputs of these metering photoelectric transducer means are synthesized to make the metering mode variable. That is, in the metering system of the prior art, there are metering modes such as average metering, center emphasis average metering, spot metering, etc., whereas in an embodiment of the present invention, there is also proposed a method wherein use is made of said plurality of metering photoelectric transducer means and the metering outputs thereof are synthesized to change the metering mode.

Other objects and features of the present invention will become apparent from the following detailed description taken in conjunction with the accompanying drawings.

BRIEF DESCRIPTION OF THE DRAWINGS

FIGS. 1, 1A and 1B are schematic diagrams showing the epitome of the optical and electrical construction of an embodiment of the present invention as applied to a single lens reflex camera.

DESCRIPTION OF THE PREFERRED EMBODIMENTS

Figure 1A:
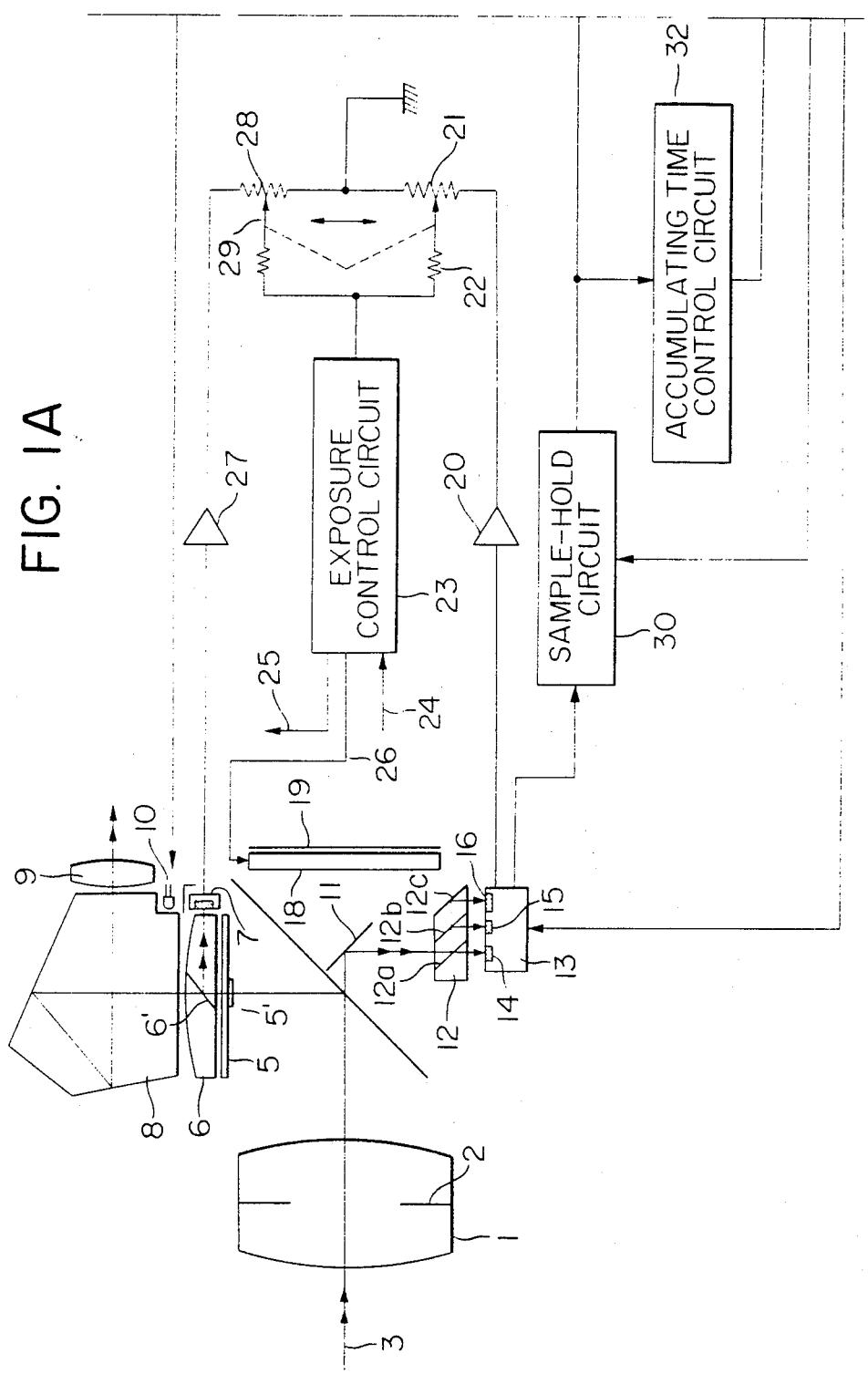
Figure 2:
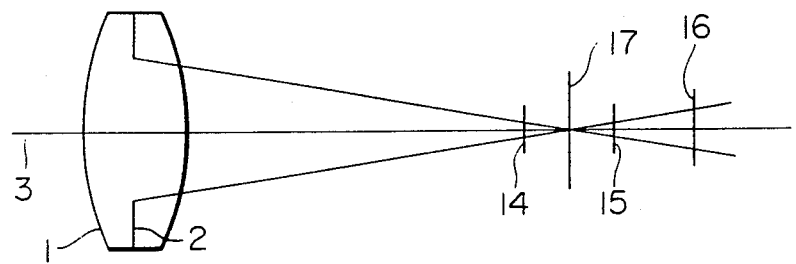
FIG. 2 is an optical equivalent diagram showing the arrangement relation on the optical axis of two light-receiving portions for the focus detection and one light-receiving portion for the metering in the light-receiving element shown in FIG. 1.

Referring to FIGS 1A and 1B, reference numeral 1 designates a picture-taking lens having a variable diaphragm 2. Reference numeral 3 denotes the optical axis of the lens 1, and reference numeral 4 designates a quick return mirror formed by a half-mirror obliquely disposed relative to the optical axis 3. The light beam reflected by the quick return mirror 4 is upwardly deflected and travels through a screen plate 5 having a distance measuring field mark 5', a cut condenser lens 6 having a half-transmitting portion 6', a pentaprism 8 and an eyepiece 9 to an eye. The light beam reflected by the half-transmitting portion 6' is received by a metering element 7 (a first metering element). Designated by 10 is a display element such as LED for displaying the focusing state of the picture-taking lens 1 by the output of a focus detecting system which will hereinafter be described. The display element 10 is disposed so that it can be visually perceived within a viewfinder. Reference numeral 11 denotes an auxiliary mirror for downwardly deflecting the light beam passed through the half-transmitting portion of the quick return mirror 4, and this light beam enters a beam splitting prism 12 and is split into three light beams of substantially equal enery by the half-transmitting mirror portions 12a and 12b and the total reflection mirror portion 12c of the prism 12, and enters a light-receiving element 13. The light-receiving element 13 comprises three light-receiving portions 14, 15 and 16, of which the portions 14 and 15 are for focus detection and the portion 16 is for metering (which constitutes a second metering element). The relative positional relation on the optical axis between these light-receiving portions 14, 15 and 16, as shown in FIG. 2, is such that the liht-receiving portions 14 and 15 are disposed at equidistant positions forward and rearward of the predetermined focal plane 17 of the picture-taking lens 1 while the light-receiving portion 16 (second metering element) is disposed rearwardly of the light-receiving portion 15. This is because the three light-receiving portions 14, 15 and 16 have an optical light path difference therebetween due to the construction of the beam splitting prism 12. The photoelectric outputs from the light-receiving portions 14 and 15 are applied as input to a focus detecting circuit system while the photoelectric output from the light-receiving portion 16 is applied as input to a metering circuit system. Reference numeral 18 designates a shutter, and reference numeral 19 denotes a film.

The metering output from the light-receiving portion 16 (second metering element) is amplified by an amplifier 20 and imparted to a variable resistor 21, which has one end thereof grounded, and a resistor 22 as a protective resistor is connected to the output point, namely, the sliding portion, of the variable resistor 21 so that the output information thereof is applied as input to a conventional exposure control circuit 23 through the resistor 22. The exposure control circuit 23, if it is, for example, of the aperture-priority system, has set aperture information imparted to the input end 24 thereof through an unshown conventional means operatively associated with the diaphragm 2 of the picture-taking lens. Reference numeral 25 designates the exposure display output, and reference numeral 26 denotes the shutter control output.

On the other hand, the photoelectric output of the metering element 7 (first metering element) is amplified by an amplifier 27 and applied as input to the exposure control circuit 23 through a variable resistor 28 and a protective resistor 29. The sliding ends of the variable resistors 21 and 28 are designed so as to be operatively associated with each other and if they slide in the direction of arrow indicated in the figure, as they go upwardly as viewed in the figure, the weight of the output of the metering element 7, of the composite output, becomes greater and the weight of the output of the light-receiving portion 16 becomes smaller and, as they go downwardly, the weight of the output of the light-receiving portion 16 becomes greater and the weight of the output of the metering element 7 becomes smaller. Accordingly, assuming that the metering field of the metering element 7 is set to that for the usual average metering and that the metering field of the light-receiving portion 16 is set to that for the spot metering, the ratio of weight between the two metering outputs is continuously changed by the sliding movement of the sliding ends of the two variable resistors 21 and 28, whereby various metering modes from the average metering to the spot metering are realized.

The focus detecting system in the present embodiment will now be described. The focus detecting method in the present embodiment is one comprising comparing the sharpnesses of the images on the light-receiving portions 14 and 15. Each of the light-receiving portions 14 and 15 is constructed as a photodiode array (MOS image sensor) or a charge transfer device such as CCD, BBD or the like which comprises, for example, a plurality of photoelectric transducer elements and has the function of producing the photoelectric output of each element as a time-serial signal. In the figures, to express these as a unit, the light-receiving portions are designated by 13 as a light-receiving element. The time-serial signal of the output of the light-receiving element 13, namely, the output of each photoelectric transducer element in each of the light-receiving portions 14 and 15, is applied as input to a sample hold circuit 30 for effecting the sample hold of the same signal. Sampling pulse is supplied to the sample hold circuit 30 from a controller 31. The output of the sample hold circuit 30 provides the time-serial signal of illumination distribution of the image. This output will hereinafter be referred to the image signal. The level of the image signal is adjusted by controlling the time during which the photoelectric conversion signal of the image illumination is accumulated in each photoelectric transducer element (hereinafter referred to as the accumulating time). Generally, the MOS image sensor or the charge transfer device has, as a feature thereof, the function of accumulating the photoelectric conversion output of each photoelectric transducer element for a predetermined time and thereafter putting out the said output, and in the present embodiment, such a device may suitably be employed as the light-receiving element. The accumulating time must be controlled in accordance with the brightness of the image so that the level of the image signal is always proper and, in the present embodiment, the output of the sample hold circuit 30 is directed to an accumulating time control circuit 32 to effect the above-described function. On the other hand, the output of the sample hold circuit 30, namely, the image signal, is applied as input to an image signal variation detecting circuit 33 which detects any variation in the same signal to extract the sharpness information therefrom. The detecting circuit 33 specifically comprises a differentiating circuit or a combination of a delay circuit and a differential circuit. The output of the image signal variation detecting circuit 33 corresponds to the AC component other than the DC component of the image signal, and the amplitude of the AC component becomes greater as the sharpness becomes higher. The same output is applied as input to an emphasizing circuit 34 which serves to emphasize one of these components which has a great amplitude and press one of these components which has a small amplitude. Accordingly, the output of the emphasizing circuit 34 responds very sensitively to the sharpness. That is, as the sharpness becomes higher and the level difference between the light and dark of the image becomes greater, the amplitude of the above-mentioned AC component becomes greater. The component of greater amplitude is more emphasized and conversely, if the sharpness becomes lower and the amplitude of the above-mentioned AC component becomes smaller, the component is conversely subjected to a suppressing action in the emphasizing circuit 34 and as a result, as the sharpness becomes higher, the output of the emphasizing circuit 34 is sharply increased. Designated by 35 is an emphasizing characteristic control circuit for changing the input level at which the emphasizing of the emphasizing circuit 34 is effected or changing the degree of the emphasizing effect in accordance with the position of each photoelectric transducer element in the reception range of the image which is the whole of said element. Denoted by 36 is a double integrating circuit which integrates and reversely integrates the output of the emphasizing circuit 34 over a predetermined image reception range. The fundamental functions of the circuit 36 are to integrate the output of the image signal, subjected to the process up to the emphasizing circuit 34 and corresponding to the reception range of one of the light-receiving portions 14 and 15 (hereinafter referred to as the view field) and to reversely integrate this integrated value at a predetermined time attenuation rate, thereby specifying the level of said integrated value. These functions are successively performed for the outputs of the image signals of the two light-receiving portions 14 and 15 which have been subjected to the process up to the emphasizing circuit 34, and the respective results are applied as input to a subsequent display control circuit 37. The above-mentioned integrated value, as can be appreciated from what has previously been described, corresponds to the sharpness of the images in the view fields of the light-receiving portions 14 and 15 and therefore, the outputs of the double integrating circuit 36 for the view fields of the respective light-receiving portios are compared in the display control circuit 37 and, on the basis of the result of the comparison, display is effected by the display element 10 such as LED or the like. If this is done, not only the in-focus position can be known by recognizing the display condition of the display element 10 also the picture-taking lens 1 can be properly focused to a desired object. The above-described light receptioon and various signal processings or controls are carried out in a predetermined sequence, and these are accomplished by the control output of the controller 31.

In the above-described manner, it becomes possible to effect focus detection and to effect a metering whose mode is variable.

Figure 3:
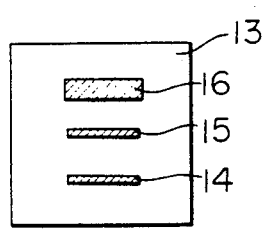
FIG. 3 is a schematic view of the light-receiving element as seen from the front thereof.

FIG. 3 is a front view of the light-receiving element 13 shown in FIG. 1, and the light-receiving portion 16 is enlarged relative to the light-receiving portions 14 and 15 to somewhat enlarge the metering field.

Figure 4:
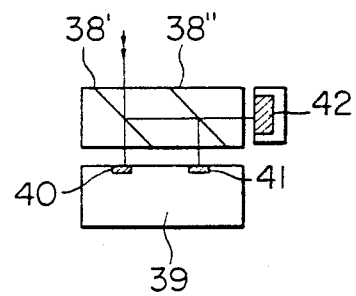
FIG. 4 shows another example of the arrangement of the three light-receiving portions.

FIG. 4 shows an example in which the focus detecting element and the metering element are constructed discretely from each other. In FIG. 4, reference numeral 38 designates a splitting prism having half-transmitting surfaces 38' and 38", and reference numeral 39 denotes a focus detecting element having light-receiving portions 40 and 41. Designated by 42 is a metering element disposed in a relationship for receiving the light beam split by the splitting prism 38 at a separate position. The function of such arrangement is entirely similar to that of the example shown in FIG. 1.

Figure 5:
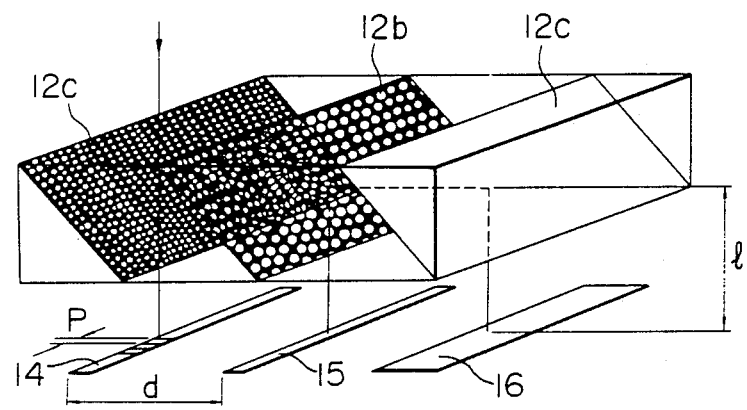
FIGS. 5, 6 and 7 are perspective views showing three examples of the light splitting prism.
Figure 6:
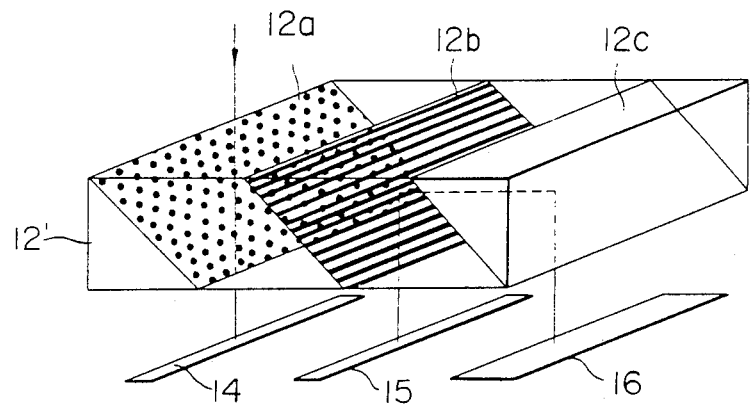
Figure 7:
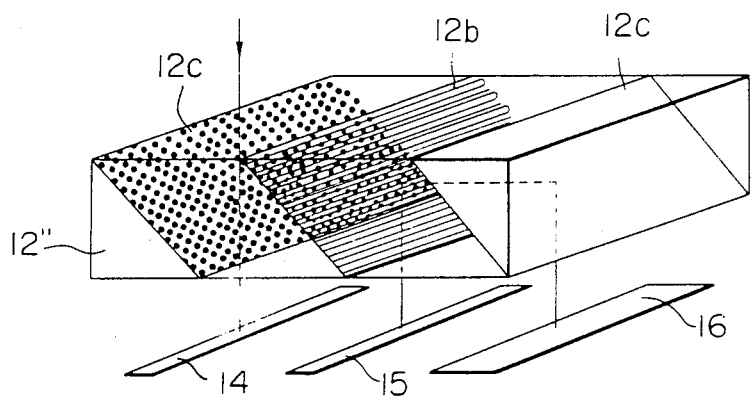

FIGS. 5, 6 and 7 show examples of the splitting prism suitable for use in the present invention.

Referring to FIG. 5, the splitting prism 12 shown there is formed of a transparent material such as, for example, $LASF_{016}$ having a refractive index $nd = 1.772$ or BK7 having a refractive index $nd = 1.516$, and area type beam splitting surfaces 12a and 12b and ordinary mirror surface 12c are provided therein. As regards the transparent material used in the splitting prism 12, it also has the function of adjusting the light path length difference between the imaging light beams entering the light-receiving portions 14 and 15 by the refractive index thereof.

Although it depends on the logic of the focus detecting system and the type of the interchangeable lens in use, in order to detect the focus more accurately, it is desirable that the light path length difference (2L of FIG. 8) between the light beams entering the light-receiving portions 14 and 15 be of the order of 0.4–2.0 mm, as converted into the light path length difference in the air (the actual light path length/the refractive index of the medium), and correspondingly thereto, the distance d between the light-receiving portions 14 and 15 is set to the order of 1.0–2.0 mm.

Also, the spacing l from the position whereat each light beam enters the beam splitting surfaces 12a, 12b and mirror surface 12c to each light-receiving surface is the order of 1–2 mm, as converted into the light path length in the air, and the pitch P between the segments in the light-receiving portions 14 and 15 is about 30 μm.

In the splitting prism 12 of such construction, area type beam splitting surfaces (random dot mirrors) 12a and 12b having small circular transmitting portions are arranged at random area provided at 45 degrees with respect to the light-receiving surface, as shown in FIG. 5. The light transmitting quantity T of the random dot mirror 12a is designed to be $T = 33\% \pm 2\%$ as simply calculated at the area ratio of the light transmitting portion and the light reflecting portion when the mirror surface is scanned by an imaging light beam corresponding to F5.6–F8 in the direction of arrangement of segments, and in case of the random dot mirror 12b, the light transmitting quantity T is designed to be $T = 50\% \pm 3\%$. Of course, strictly, the area ratio is determined with the absorbing characteristic of the reflecting film, the intensity distribution of the point image, etc., taken into account.

The purpose of arranging small circles at random is to avoid a situation that if they are periodically arranged, the collapse of the point image becomes great due to diffraction or that where there is a light beam passing via two area type mirrors as shown in FIG. 5, moire is created between the patterns on the mirror surfaces and when the light-receiving surface is illuminated by a uniform light beam, so that an error is created in the intensity ratio between the light-receiving portions or the uniformity is lost. However, if the arrangement is too random, it will cause non-uniformity of the illumination on the light-receiving surface and therefore, care must be taken to balance the randomness.

The average size of the smallest diameter of the light transmitting portions or the light reflecting portions on the area type beam splitting surface which are indicated as small circles in FIG. 5 should desirably be greater than 1/100 and less than 1/10, where 1 is the air converted light path length from the beam splitting surface to the light-receiving surface. The reason is that if said size is less than 1/100, the MTF of the split light remarkably falls and if said size is greater than 1/10, where a lens of F5.6 or F8 is used and the light beam for imaging each point becomes thin, the uniformity of the image is aggravated. According to experiments, the optimal value of said size in keeping the balance between such value of MTF and the uniformity has been about 1/30 in case of the previously described sensor.

The incident light beam is split by the use of the area type beam splitting surfaces 12a and 12b, and the split imaging light beams are directed to the light-receiving portions 14 and 15 and the sharpnesses of the images are detected as described in connection with FIG. 1, whereby the focusing state can be known. In order to know the right focusing state exactly, it is necessary that beam splitting be carried out on each beam splitting surface at a ratio of quantity of light of about 1:1 between the two imaging light beams so that there is no difference in chromatic characteristic and polarization characteristic, and the area type beam splitting surfaces are inexpensive as compared with dielectric material half-mirrors and can satisfy the above-mentioned condition.

Now, where focus detection is effected by evaluation of the sharpness of the image, it is desirable that the MTF of the imaging optical system up to the respective light-receiving portions 14 and 15 be well balanced. This is so because, as previously described, the focus position is detected by comparing the integrated values of the variations in the image signals from the light-receiving portions 14 and 15 disposed substantially equidistant forward and rearward of a predetermined focal plane (film surface).

Figure 8:
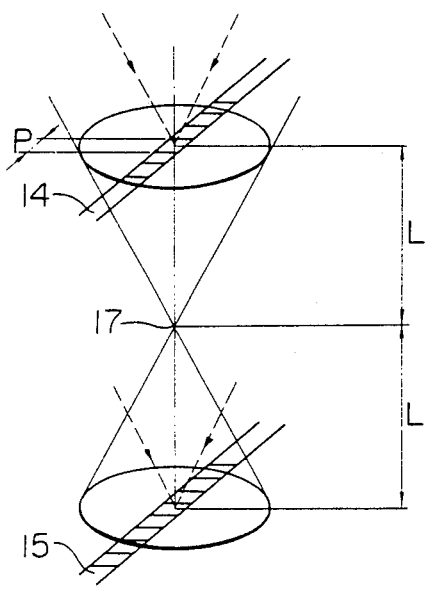
FIG. 8 is an optical equivalent diagram showing the arrangement relation on the optical axis of the light-receiving portions for the focus detection relative to the light splitting prism shown in FIGS. 5, 6 or 7.

MTF has been calculated with regard to an optical system using the splitting prism 12 of FIG. 5. The diameter of the small circles of the transmitting portion on the area type beam splitting surface 12a is set to about 20μ, and the diameter of the small circles on the beam splitting surface 12b is set to 25μ. Where this optical system is replaced by an equivalent optical system as shown in FIG. 8 and yet it is assumed that the beam splitting surfaces 12a and 12b are installed on the optical axis at predetermined distances from the light-receiving portions 14 and 15 and perpendicularly to the optical axis, the MTF in the direction of arrangement of segments when the image is formed on each light-receiving surface is as indicated by the lower two graphs A in FIG. 9. Assuming that the pitch between the segments on each light-receiving portion 14, 15 is P, the Nyquist frequency (the limit frequency at which any frequency higher than the same frequency cannot properly respond as a sensor) is given by fH = 1/2P (number/mm). Thus, in FIG. 9, 20 numbers/mm on the horizontal axis is the Nyquist frequency of the light-receiving portion of segment pitch P = 25μ and 15 numbers/mm is the Nyquist frequency of the light-receiving portion of P = 33.3μ. The Nyquist frequency of the light-receiving portion of P = 30μ is shown by α.

As is apparent from this figure, any spatial frequency component greater than the Nyquist frequency can be cut by using the area type beam splitting surface, whereby the MTF thereof can be minimized and accordingly, a false signal is not mixed greatly with the image signals obtained from the light-receiving portions 14 and 15. Ideally, it is desirable that MTF up to the Nyquist frequency be 1 and MTF be zero for any greater frequency, but in reality, it is difficult to make an area type beam splitting surface having such characteristics and generally, if MTF is completely rendered to zero for the Nyquist frequency by an area type beam splitting surface, MTF for any lower frequency will inconveniently be minimized and therefore, in the present example, MTF for the Nyquist frequency is set to a predetermined value greater than zero.

The experiment shows that when use is made of a combination of the area type beam splitting surfaces 12a and 12b of FIG. 5, there occurs problem that MTF as a whole is low in terms of the focus detecting function and the balance between the MTF's for the light-receiving portions 14 and 15 is bad.

Reference is now made to FIG. 6 to describe a second embodiment which overcomes this problem.

Figure 9:
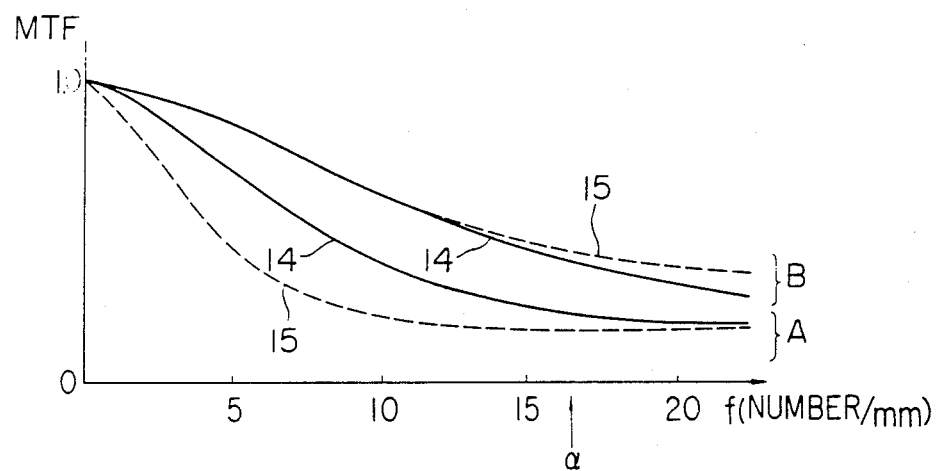
FIG. 9 is a graph illustrating the MTF of the light splitting prisms shown in FIGS. 5 and 6.

The splitting prism 12' of FIG. 6, like the splitting prism of FIG. 5, is such that area type beam splitting surfaces 12'a and 12'b and a mirror surface 12'c are provided in a prism of transparent material, and the diameter of the small circles in the light transmitting portion of the area type beam splitting surface 12'a is 45μ. The arrangement of the small circles is what may be called quasi-random, that is, they are arranged in random patterns in a light beam of F5.6, and then with the width of this light beam as one pitch, the random patterns are arranged periodically. The diameter of the small circles is about twice that in the case of the beam splitting surface 12a of FIG. 5 and, as can be seen from the graph B of FIG. 9, MTF keeps a greatly higher value. A second improvement in the example shown in FIG. 6 is that a striped mirror is used as the second area type beam splitting surface 12'b. The pitch of the stripes is 40μ, the width of the opening (light transmitting portion) is 20μ, and the direction of the stripes is coincident with the lengthwise direction of the light-receiving portion 15, namely, the direction of arrangement of the photoelectric transducer elements (segments). Thus, the fall of MTF in the direction of arrangement of the segments by the second beam splitting surface 12'b does not occur and therefore, as seen in FIG. 9, the irregularity of the values of MTF's for the respective light-receiving portions can be minimized, and the present example has exhibited an excellent characteristic even when it has been used in a focus detecting system. In the present example, the stripes are periodically arranged, but it is also possible to use a striped beam splitting surface having a random pitch and width which satisfy the average transmission factor.

The area type beam splitting surface as described above may be manufactured by two methods depending on the size of the pattern, and any of these methods can produce the aforedescribed area type beam splitting surface without inducing the problems of polarization characteristic and chromatic characteristic. One of the manufacturing methods is a method which utilizes the same photofabrication as that used in the manufacture of IC or the like and which is used in a case where the line width of the pattern in the light transmitting portion is 0.1 mm or less, and the other method is a mask evaporating method which becomes possible in a case where the thickness of the pattern in 0.1 mm or greater. The mask method comprises bringing a metal thin plate mask (whose thinness is of the order of 0.05 mm–0.1 mm) formed with a pattern to be evaporated into intimate contact with a glass substrate and evaporating a metal such as Al or the like onto the mask, and this method is very inexpensive but somewhat poor in pattern accuracy.

In the case of the examples shown in FIGS. 5 and 6, among the area type beam splitting surfaces 12a, 12b; 12'a, 12'b and mirror surfaces 12c, 12'c, evaporating silver onto 12a; 12'a and evaporating Al onto 12b; 12'b; 12'c has resulted in a somewhat better chromatic characteristic (the balance of the light transmitting factors at the wavelengths of lights reaching the sensors) than evaporating Al onto all of these surfaces.

That is, where importance is attached to the chromatic characteristic, using silver as the substance to be evaporated onto the beam splitting surface 12a; 12'a is better, but silver is poor in weather resistant property (durability) and if, as shown in FIG. 5, the mirror portions (black portions) are exposed in the end surface of the prism, the prism will be corroded from such portions and the corrosion will gradually progress deep in the prism and in the worst case, the glass prism may be stripped off. Accordingly, it is desirable that the mirror portions not be interconnected with one another and that the interior of the small circles be a light reflecting portion. In that case, however, to keep the reflection factor 66.6% of the area type beam splitting surface 12a; 12'a. one reflecting circle must be made proximate to other reflecting circle and there is not enough room to make the arrangement of the circles random and thus, the arrangement becomes substantially regular.

FIG. 7 shows an example of such case, in which the diameter of the small circular mirrors in the area type beam splitting surface 12"a is 90μ and the small circular mirrors are arranged regularly and the stripe pitch of the area type beam splitting surface 12"b is similar to that in FIG. 6. As a result, MTF has obtained a performance substantially similar to the MTF (graph B) of the splitting prism 12' of FIG. 6 shown in FIG. 9, but the uniformity of the arrangement direction of the segments of the light-receiving portion has been reduced and periodical irregularity of the order of ±10% has been created when the light-receiving portion has been scanned by a light beam of F5.6.

Various patterns of the area type beam splitting surface are conceivable and, if such beam splitting surface is simply for separating a light beam into two light beams, the pattern thereof can be simply designed by preparing an evaluation program of uniformity and an evaluation program of MTF, but where area type beam splitting surfaces are superposed one upon another as seen in the examples of FIGS. 5–7, periodical patterns similar in period to each other are not preferable in the sense of avoiding creation of moire. In the above-described examples, the average diameter of the transmitting portions or the reflecting portions is in the range of 1/100–1/10 as previously mentioned.

As regards the focus detecting system described in connection with FIG. 1, the performance and accuracy thereof can be improved by using the splitting prism 12, 12', 12" described in connection with FIGS. 5–7.

Now, according to the present invention, as has been described above, there is provided a more rational form of metering system and it is very advantageous in optical construction, particularly in that is also uses a focus detecting optical system. For example, as shown in the embodiment, the metering light-receiving portion with the focus detecting light-receiving portion, can be constructed in the form of monolithic IC as an element and this enables great simplification of the optical construction and great reduction in the cost thereof to be achieved.

As regards the specific construction of the focus detecting circuit system (FIG. 1) shown as an embodiment, the construction as described, for example, in U.S. patent application Ser. No. 151,703, now U.S. Pat. No. 4,377,742, by the assignee of the present invention (filed May 20, 1980 and entitled "Image Sharpness Detecting System", Kawabata et al.) is applicable as an example.

What we claim is:

1. In a device having a focus detecting system and an exposure measuring system, said focus detecting system comprising:
    (a) an optical system for focus detection;
    (b) first photoelectric means for the focus detection, said first photoelectric means being arranged to receive light from an object through said optical system and to produce an output signal in response to the received light; and
    (c) first circuit means for the focus detection, said first circuit means being arranged to receive the output signal of said first photoelectric means and to provide a focus related output signal on the basis of the received signal;

an exposure measuring system including
    (A) second photoelectric means for exposure measurement, said second photoelectric means being arranged to receive the light from the object through said optical system for the focus detection and to produce an output signal in response to the received light; and
    (B) second circuit means for exposure measurement, said second circuit means being arranged to receive the output signal of said second photoelectric means and to provide an exposure related output signal on the basis of the received signal, wherein said optical system includes light dividing optical means for distributing the light to said first and second photoelectric means and having two different types of area type beam splitting surfaces each area type beam splitting surface having a pattern with a plurality of light transmitting parts and a plurality of light reflecting parts, said second photoelectric means being arranged together with said first photoelectric means to receive the light divided by said optical means, said first photoelectric means having a plurality of photoelectric elements arranged to receive the light divided by respective area type beam splitting surfaces.

2. The device according to claim 1, wherein one of the area type beam splitting surfaces is a random dot mirror, and the other of the area type beam splitting surfaces is a striped mirror.

3. The device according to claim 1, wherein said second photoelectric means, together with said first photoelectric means, is disposed on the same plane which is located at a predetermined position relative to said light dividing optical means.

4. The device according to claim 3, wherein said second photoelectric means, together with said first photoelectric means, is formed on or in the same semiconductive substrate.

5. The device according to claim 1, 3 or 4, wherein said optical system includes a focus adjustable optical means having an optical axis and a predetermined focal plane, said first photoelectric means is arranged to receive the light at a predetermined position with respect to said focal plane along said optical axis, and said second photoelectric means is arranged to receive the light at a position remote from said focal plane along said optical axis.

6. The device according to claim 5, wherein said first photoelectric means includes two photoelectric elements arranged to receive the light before and behind said focal plane along the optical axis, and said second photoelectric means is arranged to receive the light at a position backwardly remote from the position behind the focal plane whereat one of said two elements receive the light.

7. The device according to claim 6, further comprising:
third photoelectric means for the exposure measurement, said third photoelectric means being arranged to receive a light coming from the object and to produce an output signal in response to the received light; and
wherein said second circuit means includes mixing means for mixing the output signals of said second and third photoelectric means and processing means for providing said exposure related output signal on the basis of the mixed signals.

8. The device according to claim 7, wherein said third photoelectric means is arranged to receive the light from the object through said focus adjustable optical means.

9. The device according to claim 8, wherein said device is a camera and said focus adjustable optical means is a camera objective for picture-taking.

10. The device according to claim 7, wherein said second and third photoelectric means have different light receiving manners.

11. The device according to claim 10, wherein said second and third photoelectric means have different light receiving angles.

12. The device according to claim 11, wherein the light receiving angle of said third photoelectric means is larger than that of said second photoelectric means.

13. The device according to claim 10, wherein said mixing means is manually adjustable so that the mixing ratio of the output signals of the second and third photoelectric means can be changed.

14. The device according to claim 5, wherein said device is a camera and said focus adjustable optical means is a camera objective for picture-taking.

15. The device according to claim 1, 3 or 4, further comprising:
third photoelectric means for the exposure measurement, said third photoelectric means being arranged to receive a light coming from the object and to produce an output signal in response to the received light; and
wherein said second circuit means includes mixing means for mixing the output signals of said second and third photoelectric means and processing means for providing said exposure related output signal on the basis of the mixed signals.

16. The device according to claim 15, wherein said second and third photoelectric means have different light receiving manners.

17. The device according to claim 16, wherein said second and third photoelectric means have different light receiving angles.

18. The device according to claim 17, wherein the light receiving angle of said third photoelectric means is larger than that of said second photoelectric means.

19. The device according to claim 15, wherein said mixing means is manually adjustable so that the mixing ratio of the output signals of the second and third photoelectric means can be changed.

20. The device according to claim 19, wherein said second and third photoelectric means have different light receiving manners.

21. The device according to claim 20, wherein said second and third photoelectric means have different light receiving angles.

22. The device according to claim 21, wherein the light receiving angle of said third photoelectric means is larger than that of said second photoelectric means.

* * * * *